(12) United States Patent
Knott (10) Patent No.: US 7,210,896 B2
(45) Date of Patent: May 1, 2007

(54) ELECTRICAL POWER GENERATION ASSEMBLY

(75) Inventor: David S Knott, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/259,269

(22) Filed: Oct. 27, 2005

(65) Prior Publication Data

US 2006/0033340 A1 Feb. 16, 2006

Related U.S. Application Data

(63) Continuation of application No. PCT/GB2004/002128, filed on May 18, 2004.

(30) Foreign Application Priority Data

| May 20, 2003 | (GB) | 0311536.7 |
| Mar. 6, 2004 | (GB) | 0405115.7 |

(51) Int. Cl.
  F03D 11/04 (2006.01)
  F03D 1/00 (2006.01)
(52) U.S. Cl. .............. 415/4.3; 415/4.5; 415/183; 415/908; 416/10
(58) Field of Classification Search ............ 415/4.2, 415/4.3, 4.4, 4.5, 7, 183, 908; 416/10, 11; 290/55; 244/24, 25, 30, 31, 33, 125, 127, 244/138 R
See application file for complete search history.

(56) References Cited

U.S. PATENT DOCUMENTS

| 2,177,801 | A | * | 10/1939 | Erren | 290/55 |
| 3,180,590 | A | * | 4/1965 | Fitzpatrick | 244/30 |
| 3,448,864 | A | * | 6/1969 | Fenn et al. | 212/71 |
| 4,084,102 | A | * | 4/1978 | Fry et al. | 290/55 |
| 4,102,519 | A | * | 7/1978 | Crosby, Jr. | 244/125 |
| 4,179,886 | A | * | 12/1979 | Tsubota | 60/398 |
| 4,285,481 | A | | 8/1981 | Biscomb | |
| 4,450,364 | A | | 5/1984 | Benoit | |
| 5,484,257 | A | | 1/1996 | Osborn | |

FOREIGN PATENT DOCUMENTS

| DE | 0 830 628 A | 2/1952 |
| DE | 2 907 187 A | 8/1980 |
| DE | 3 120 997 A | 5/1982 |
| EP | 0 045 202 A | 2/1982 |
| EP | 0 391 601 A | 10/1990 |
| FR | 2 381 921 A | 9/1978 |
| FR | 2 561 719 A | 3/1984 |
| GB | 2 212 563 A | 7/1989 |
| WO | WO 83/01279 A | 4/1983 |
| WO | WO 99/13220 A | 3/1999 |
| WO | WO 02/092427 A1 * | 11/2002 |

* cited by examiner

Primary Examiner—Edward K. Look
Assistant Examiner—Nathan Wiehe
(74) Attorney, Agent, or Firm—W. Warren Taltavull; Manelli Denison & Selter PLLC (57) ABSTRACT

An electrical power generation assembly comprising a main body having a low density to provide lift and wind driven means on its surface to generate electrical power. The main body has a part-circular, or a part-elliptical, cross section frontal region. The main body has a first distance and a second distance. The ratio of the first distance to the second distance is equal to or more than 0.5 and equal to or less than 5 according to the shape of the frontal region of the main body. The ratio of the diameter of the wind driven means to the first distance is equal to or less than 0.25.

46 Claims, 7 Drawing Sheets

ELECTRICAL POWER GENERATION ASSEMBLY

This is a continuation of International Appln. No. PCT/GB2004/002128 filed May 18, 2004 designated the U.S.

FIELD OF THE INVENTION

The present invention relates to an electrical power generation assembly.

BACKGROUND OF THE INVENTION

Wind power is presently the world's fastest growing source of renewable energy having an annual growth rate of 40% over the last seven years. The disadvantage of known wind turbine technology is that wind speed near the ground is reduced by irregularities. As a result, wind turbines are arranged on towers above the ground. The siting of such towers has to be chosen carefully, taking into account not only prevailing local wind speed, but also the opinion of local residents.

Our UK patent application 0311536.7 filed 20 May 2003 discloses an electrical power generation assembly comprising a main body having a sufficiently low density to effect lift thereto, and wind driven means on a surface of the main body to generate electrical power.

SUMMARY OF THE INVENTION

Accordingly the present invention seeks to provide a novel electrical power generation assembly.

Accordingly the present invention provides an electrical power generation assembly comprising a main body having a sufficiently low density to effect lift thereto, wind driven means on a surface of the main body to generate electrical power, the main body having a generally prismatic shape, the main body having a frontal region including a part-circular cross-section or a part-elliptical cross-section, the main body having a first distance perpendicularly from a central plane of the main body to a line of intersection between the frontal region and the remainder of the main body, the main body having a second distance from the line of intersection between the frontal region and the remainder of the main body parallel to the central plane of the maim body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25.

Preferably the main body comprises two or more portions. Preferably a first portion is arranged to define the frontal region of the main body and a second portion is arranged to define the remainder of the main body. Preferably the first portion contains a lighter than air fluid and the second portion contains air. Preferably the second portion is pressurised by the dynamic head of an airflow over the main body.

Preferably the first portion comprises means to change the shape of the frontal region of the main body. Preferably the means to change the shape of the frontal region of the main body changes the frontal region from a substantially circular cross-section in a first mode of operation to a substantially elliptical cross-section in a second mode of operation.

Preferably the means to change the shape of the frontal region of the main body changes the ratio of the first distance to the second distance from 0.5 to 1.5 in a first mode of operation to 3 to 5 in a second mode of operation.

Preferably the means to change the shape of the frontal region comprises expandable means, more preferably inflatable means.

Alternatively there are means to move the wind driven means relative to the surface of the main body. The means to move the wind driven means moves the wind driven means from a first position relative to the surface of the main body in a first mode of operation to a second position nearer to the surface of the main body in a second mode of operation.

The present invention also provides an electrical power generation assembly comprising a main body having a sufficiently low density to effect lift thereto, wind driven means on a surface of the main body to generate electrical power, the main body having a generally prismatic shape, the main body having a frontal region including a part-circular cross-section or a part-elliptical cross-section, the main body having a maximum thickness at the plane of intersection between the frontal region and the remainder of the main body, the main body having a first distance equal to half the maximum thickness of the main body, the main body having a second distance from the plane of intersection between the frontal region and the remainder of the main body parallel to the central plane of the maim body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25.

The present invention also provides an electrical power generation assembly comprising a main body having a sufficiently low density to effect lift thereto, wind driven means on a surface of the main body to generate electrical power, the main body having a generally prismatic shape, the main body having a frontal region including a part-circular cross-section or a part-elliptical cross-section, a first portion is arranged to define the frontal region of the main body and a second portion is arranged to define the remainder of the main body, the first portion comprises means to change the shape of the frontal region of the main body.

Preferably the means to change the shape of the frontal region of the main body changes the frontal region from a substantially circular cross-section in a first mode of operation to a substantially elliptical cross-section in a second mode of operation.

Preferably the means to change the shape of the frontal region comprises expandable means.

Preferably the means to change the shape of the frontal region comprises inflatable means.

The present invention also provides an electrical power generation assembly comprising a main body having a sufficiently low density to effect lift thereto, wind driven means on a surface of the main body to generate electrical power, the main body having a generally prismatic shape, the main body having a frontal region including a part-circular cross-section or a part-elliptical cross-section, means to move the wind driven means relative to the surface of the main body.

Preferably the means to move the wind driven means moves the wind driven means from a first position relative to the surface of the main body in a first mode of operation to a second position nearer to the surface of the main body in a second mode of operation.

BRIEF DESCRIPTION OF THE DRAWINGS

The present invention will be more fully described by way of example with reference to the accompanying drawings in which.

DETAILED DESCRIPTION OF THE INVENTION

Figure 1:
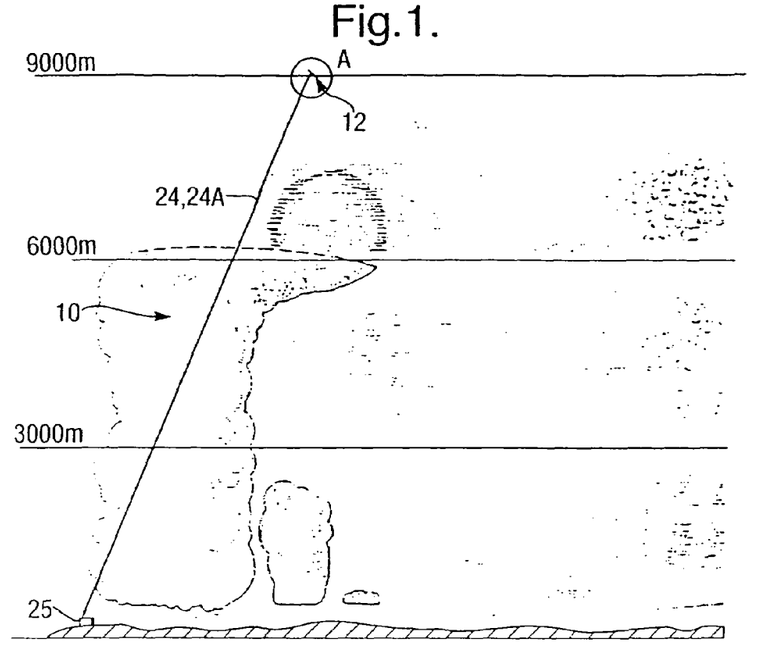
FIG. 1 shows a side view of an electrical power generation assembly according to the present invention in use.
Figures 2, 3:
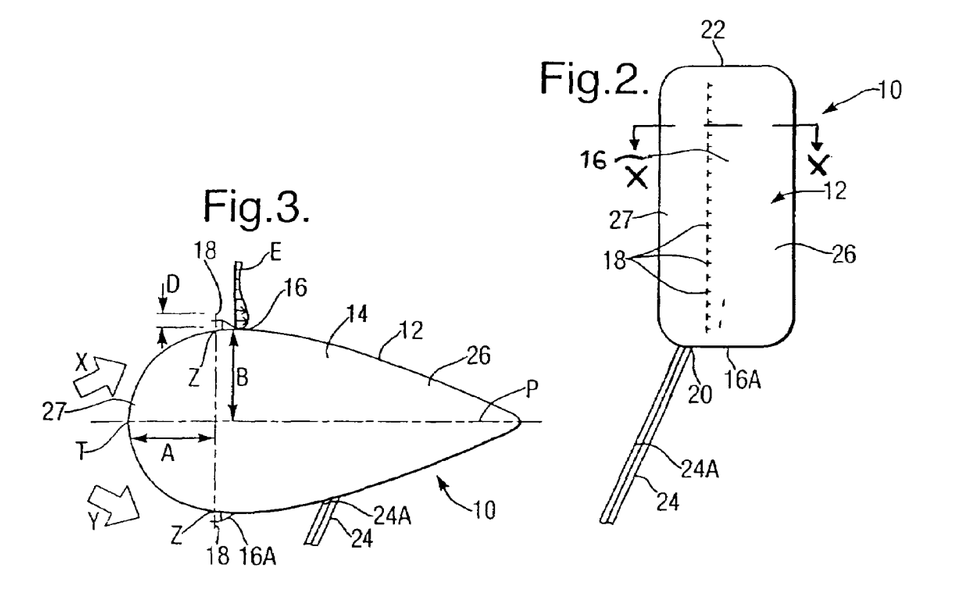
FIG. 2 is an enlarged plan view of an electrical power generation assembly according to the present invention.
FIG. 3 is an enlarged cross-sectional view along lines X—X in FIG. 2.

An electrical power generation assembly 10, as shown in FIGS. 1 to 3, comprises a main body 12 defining an internal space 14. A gas, which is less dense than air, for example helium, hydrogen, hot air etc, is contained within the internal space 14 for lifting the main body 12 above the ground. The main body 12 defines a first platform 16 and a second platform 16A, on which there are provided wind driven means in the form of arrays of wind turbines 18. In the embodiment shown the arrays of wind turbines 18 comprises a linear arrangement of a plurality of wind turbines 18 across the first platform 16 from one end 20 the opposite end 22 and a linear arrangement of a plurality of wind turbines 18 across the second platform 16A from the end 20 to the opposite end 22. Wind blows across the main body 12 in the direction indicated by arrows X and Y.

The electrical power generation assembly 10 also includes transmission means for transmitting the electrical power generated by the wind turbines 18 to the ground. The transmission means may be an electrical cable 24A. The electrical power generation assembly 10 also includes securing means for securing the main body 12 to the ground. The securing means, in the embodiment shown, is in the form of a mooring cable 24 and the electrical cable 24A may extend along side or within the mooring cable 24. An electricity station 25 is situated on the ground, to which the mooring cable 24 and the electrical cable 24A extend. In other embodiments the mooring cable 24 constitutes the electrical cable 24A and in which case only one cable 24 is provided.

Referring particularly to FIG. 3, it can be seen that the main body 12 has a frontal region 27 and a tail region 26. The position of the wind turbines 18 on the main body 12 is such that they are in the region of maximum velocity. FIG. 3 shows the wind velocity profile, marked E, of the air passing over the top and bottom of the main body 12. The wind velocity close to the surfaces of the first and second platforms 16 and 16B is may be many times the velocity at a region spaced from the surface of the platform 16 and is dependent on the shape of the main body 12. The wind turbines 18 are positioned away from the surfaces of the platforms 16 and 16A where the air moves slowly within the boundary layer of the platforms 16 and 16A.

The wind turbines 18 used for generating electricity may be wind turbines, which are known in the art.

The wind turbines 18 are relatively small in size and are distributed uniformly along the platforms 16 and 16A. This has the advantage that their weight is uniformly distributed and therefore they can be supported efficiently by the main body 12. Also, they can be positioned within the streamlines of air, that have the highest kinetic energy across the platforms 16 and 16A. Such streamlines of air are generally slightly above the boundary layer of the air across the platforms 16 and 16A.

The main body 12 has a generally prismatic shape and the frontal region 27 of the main body 12 has a part circular cross-section or a part elliptical cross-section. A prismatic shape is a shape in which the cross-sectional shape of the main body 12 is substantially constant over a significant portion of the length of the main body 12, between its ends 20 and 22. However the cross-sectional shape may change adjacent one, or both, of the ends 20. Preferably the cross-sectional shape of the main body 12 is constant over the whole of the length of the main body 12. Preferably, the cross-sectional area of the main body 12 is substantially constant throughout a significant portion of the length of the main body 12 between the ends 20 and 22. Preferably the cross-sectional area of the main body 12 is constant over the whole of the length of the main body 12. The cross-sectional shape may be polygonal, for example triangular, or may be circular etc. This is because the maximum airflow accelerations around a generally cylindrical type shaped frontal region produce twice the power magnification of that for a generally spherical shaped frontal region. In this example the main body 12 is triangular in cross-section and thus the platforms 16 and 16A are substantially rectangular, and the main body 12 has a part-circular or part-elliptical frontal region 27.

The proportions of the frontal region 27 of the main body 12 are important and are shown in FIG. 3. The main body 12 has a first distance B perpendicularly from a central plane P of the main body 12 to a line of intersection Z between the frontal region 27 and the remainder, or tail, 26 of the main body 12. The first distance B is half the maximum thickness of the main body 12, the maximum thickness of the main body 12 is at the plane of intersection Z between the frontal region 27 and the remainder, or tail, 26 of the main body. The main body 12 has a second distance A from the line of intersection Z between the frontal region 27 and the remainder, or tail, 26 of the main body 12 parallel to the central plane P of the maim body 12 to a line of intersection T between the most upstream points of the frontal region 27 and the central plane P of the main body 12. The ratio of the first distance B to the second distance A being equal to or more than 0.5 and equal to or less than 5. The air flow around elliptical prismatic shapes accelerates the air flow close to the surface of the platforms 16 and 16A so as to create power magnification factors of 60 times or greater. The wind driven means, the wind turbines 18, having a diameter D and the ratio of the diameter D to the first distance B being equal to or less than 0.25. The wind turbines 18 have a diameter of for example 2 metres to 3 metres, although other suitable diameters may be used. The wind turbines 18 are mounted on the surfaces of the platforms 16 and 16A such that the diameter of the wind turbines 18 is small compared to the maximum thickness of the main body 12. This ensures that the wind turbines 18 are placed close to the surface of the platforms 16 and 16A where power magnification is greatest to extract maximum power. Thus the frontal region 27 of the main body is part cylindrical. The wind driven means, the wind turbines, 18 are arranged at the line of intersection Z between the frontal region 27 and the remainder, or tail, 26 of the main body 12, i.e. at the point of maximum thickness of the main body 12.

The axes of rotation of the wind driven means, the wind turbines, 18 are arranged substantially parallel to the direction of flow of the wind across the main body 12, or in the chordal direction of the main body 12 substantially perpendicular to the lines Z and T. The axes of rotation of the wind driven means, wind turbines, 18 are substantially parallel to each other and the axes of rotation of the wind driven means, wind turbines, 18 are substantially parallel to the centre plane P of the main body 12. The axes of rotation of the wind driven means, wind turbines, 18 are substantially perpendicular to the plane containing the maximum thickness of the main body 12.

The wind driven means, the wind turbines, 18 are generally arranged in at least one line across the main body 12 and the lines are substantially parallel to the lines T and Z. The wind driven means, the wind turbines, 18 may be arranged on both the platforms 16 and 16A or on only a single one of the platforms 16 or 16A. Thus, the at least one line of wind driven means is arranged substantially transverse, perpendicular, to the direction of flow of the wind across the main body 12.

Figure 4:
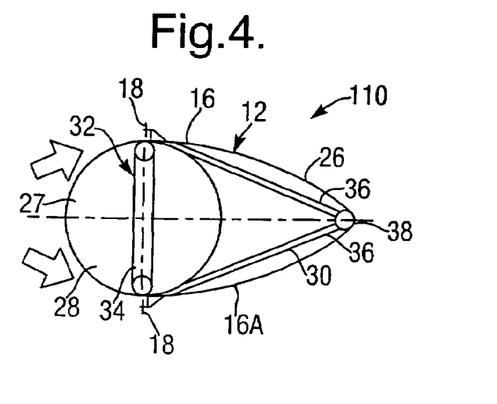
FIG. 4 is an enlarged cross-sectional view along lines X—X in FIG. 2 showing a second embodiment of an electrical power generation assembly according to the present invention in a first mode of operation.
Figure 5:
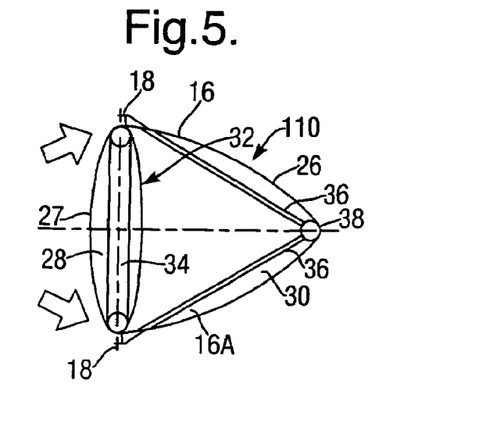
FIG. 5 is an enlarged cross-sectional view along lines X—X in FIG. 2 showing a second embodiment of an electrical power generation assembly according to the present invention in a second mode of operation.

A further embodiment of an electrical power generation assembly according to the present invention is shown in FIGS. 4 and 5. The electrical power generation assembly 110 is similar to that shown in FIGS. 1 to 3 and again comprises a main body 12 having a prismatic shape and wind driven means, wind turbines 18, arranged on the platforms 16 and 16A. The main body 12 comprises two or more portions. A first portion 28 is arranged to define the frontal region 27 of the main body 12 and a second portion 30 is arranged to define the remainder, or tail, 26 of the main body 12. The first portion 28 contains a lighter than air fluid and the second portion 30 contains air. The second portion 30 may be pressurised by the dynamic head of the airflow over the main body 12. This arrangement simplifies the shape of the lighter than air compartment and minimises cost.

The capacity factor, the mean power output/maximum power output, is a key parameter for a wind turbine electrical power generation assembly. This is because the cost is determined by the maximum power output, whereas the economic return is determined by the mean power output. Therefore, maximising capacity factor is an objective for a wind turbine electrical power generation assembly in order to minimise the cost per kWhr. At high altitude the wind speeds are considerably higher than on the ground, however the wind speed variation at high altitude is often less than at ground level, but it is still significant and may have a capacity factor of 0.25. The capacity factor of a high altitude wind turbine electrical power generation assembly may be considerably increased, typically by a factor of 3.

The electrical power generation assembly 110 in FIGS. 4 and 5 is also arranged such that the first portion 28 comprises means 32 to change the shape of the frontal region 27 of the main body 12. The means 32 to change the shape of the frontal region 27 of the main body 12 changes the frontal region 27 from a substantially part circular cross-section in a first mode of operation, as shown in FIG. 4, to a substantially part elliptical cross-section in a second mode of operation, as shown in FIG. 5.

The means 32 to change the shape of the frontal region 27 of the main body 12 changes the ratio of the first distance to the second distance from 0.5 to 1.5 in the first mode of operation to 3 to 5 in the second mode of operation. The means 32 to change the shape of the frontal region 27 comprises expandable means, more preferably inflatable means. The means 32 to change the shape of the frontal region 27 comprises one or more expandable/inflatable columns 34 arranged at the plane of maximum thickness of the main body 12. Thus the maximum thickness of the main body 12 is also changed. The changing of the shape of the frontal region 27 of the main body 12 may be achieved without changing the surface area of the main body 12. The means 32 to change the shape of the frontal region 27 may also comprise one or more hydraulic rams, pneumatic rams or electric rams. The means 32 to change the shape of the frontal region 27 may also comprise any other suitable device. The main body 12 also comprises a plurality of struts 36, for example inflated struts, pivotally mounted at 38 to the main body 12 to maintain the shape of the remainder, the tail, 26 of the main body 12.

In operation, when the wind speeds are low, in the second mode of operation, the maximum thickness of the main body 12 is increased and hence the shape of the frontal region 27 of the main body 12 is changed to a bluff part elliptical cross-section with a B/A ratio of 3 to 5, as shown in FIG. 5. This increases the airflow velocities close to the surface of the platforms 16 and 16A because more magnification of the air velocity is required in order to maintain the power output from the wind turbines 18. This increases the maximum drag on the main body 12.

In operation, when the wind speeds are high, in the first mode of operation, the maximum thickness of the main body 12 is decreased and hence the shape of the frontal region 27 of the main body 12 is changed to a part circular cross-section with a B/A ratio of 0.5 to 1. This decreases the airflow velocities close to the surface of the platforms 16 and 16A because less magnification of the air velocity is required in order to maintain the power output of the wind turbines 18. The stream lining of the main body 12 at high wind speeds has the advantage that the maximum drag load on the main body 12 is reduced. Thus the power output of the wind turbines 18 is maintained more uniform.

Figure 6:
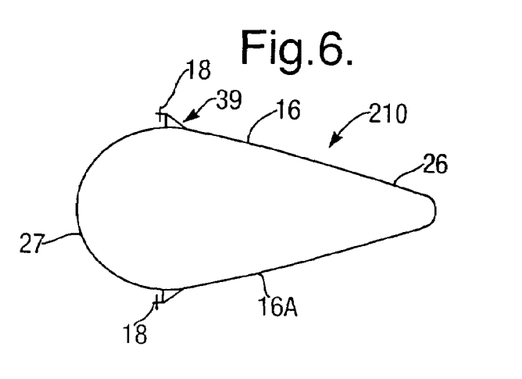
FIG. 6 is an enlarged cross-sectional view along lines X—X in FIG. 2 showing a third embodiment of an electrical power generation assembly according to the present invention in a first mode of operation.
Figure 7:
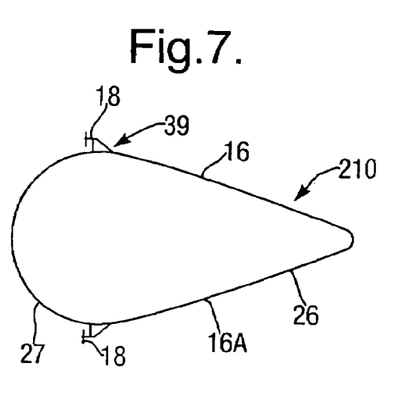
FIG. 7 is an enlarged cross-sectional view along lines X—X in FIG. 2 showing a third embodiment of an electrical power generation assembly according to the present invention in a first mode of operation.
Figure 8:
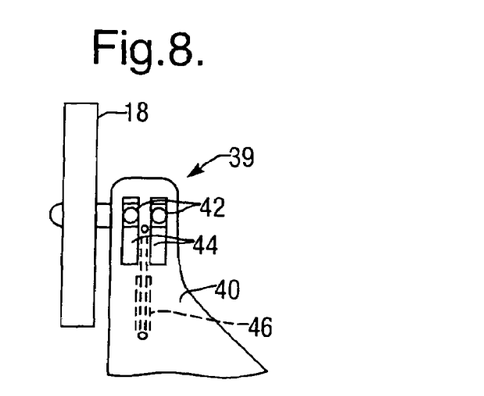
FIG. 8 is an enlarged side view of a wind turbine and tower on the electrical power generation assembly shown in FIGS. 6 and 7.

A further embodiment of an electrical power generation assembly according to the present invention is shown in FIGS. 6, 7 and 8. The electrical power generation assembly 210 is similar to that shown in FIGS. 1 to 3 and again comprises a main body 12 having a prismatic shape and wind driven means, wind turbines 18, arranged on the platforms 16 and 16A.

The electrical power generation assembly 210 in FIGS. 6 and 7 is also arranged such that there are means 39 to move the wind driven means, the wind turbines, 18 relative to the surface of the platforms 16 and 16A of the main body 12. The means 39 to move the wind driven means, the wind turbines, 18 moves the wind driven means, the wind turbines, 18 from a first position relative to the surfaces of the platforms 16 and 16A of the main body 12 in a first mode of operation to a second position nearer to the surfaces of the platforms 16 and 16A of the main body 12 in a second mode of operation, as shown in FIG. 7.

The means 39 to move each of the wind driven means, wind turbines, 18 comprises a hydraulic ram, a pneumatic ram, an electric ram, a rack and pinion or a screw jack. The means 39 to move each of the wind driven means, wind turbines, 18 may also comprise any other suitable device. For example each wind turbine 18 is mounted on a tower 40 on the platform 16 and 16A such that the wind turbine 18 is movable towards and away from the surface of the respective platform 16 and 16A by sliders 42 locating in one or more slots, or tracks, 44 in the tower 40. An electric ram 46 is provided to move the wind turbine 18 along the at least one slot 44. The electric ram 46 may be driven by electricity generated by the wind turbines 18.

In operation, when the wind speeds are low, in the second mode of operation, the wind driven means, the wind turbines, 18 are moved to the second position nearer to the surfaces of the platforms 16 and 16A of the main body 12, as shown in FIG. 7. This moves the wind turbines 18 closer to the surfaces of the platforms 16 and 16A where there is more magnification of the air velocity in order to maintain the power output from the wind turbines 18.

In operation, when the wind speeds are high, in the first mode of operation, the wind driven means, the wind turbines, 18 are moved to the first position further away from the surfaces of the platforms 16 and 16A of the main body 12 as shown in FIG. 6. This moves the wind turbines 18 further away from the surfaces of the platforms 16 and 16A where the there is less magnification of the air flow velocities close to the surface of the platforms 16 and 16A because less magnification of the air velocity in order to maintain the power output of the wind turbines 18. Thus the power output of the wind turbines 18 is maintained more uniform.

Figure 9:
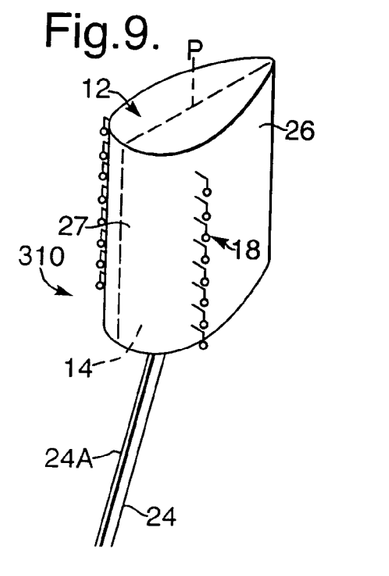
FIG. 9 is a further embodiment of an electrical power generation assembly according to the present invention.

A further embodiment of an electrical power generation assembly 310 is shown in FIG. 9 and is similar to that shown in FIGS. 2 and 3 and like parts are denoted by like numerals. In this embodiment the wind passing to one side of the main body 12 has the same velocity as wind passing on the other side of the main body 12 and therefore, the main body 12 does not move to one side or the other and stays generally still. The symmetrical configuration of the main body 12 about the central plane P provides a stabilising effect. The frontal region 27 of the main body 12 is again part cylindrical and thus is part circular in cross-section. The main body 12 is arranged with the central plane P arranged in a substantially vertical orientation.

Figure 10:
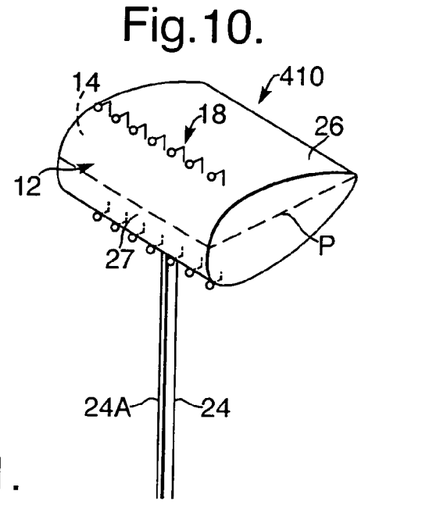
FIG. 10 is a further embodiment of an electrical power generation assembly according to the present invention.

In the embodiment of an electrical power generation assembly 410 as shown in FIG. 10 the main body 12 is arranged with the central plane P arranged in a substantially horizontal orientation. Again the frontal region 27 of the main body 12 is part cylindrical and thus is part circular in cross-section.

Figure 11:
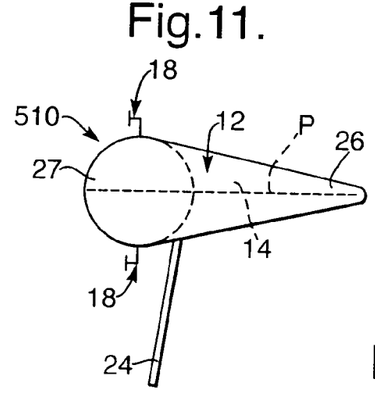
FIG. 11 is a further embodiment of an electrical power generation assembly according to the present invention.

In the embodiment of electrical power generation assembly as shown in FIG. 11 the main body 12 has an aerodynamic lifting profile about the central plane P, which is arranged at an angle to the horizontal orientation. The frontal region 27 of the main body 12 is part cylindrical and is thus part circular in cross-section.

Figure 12:
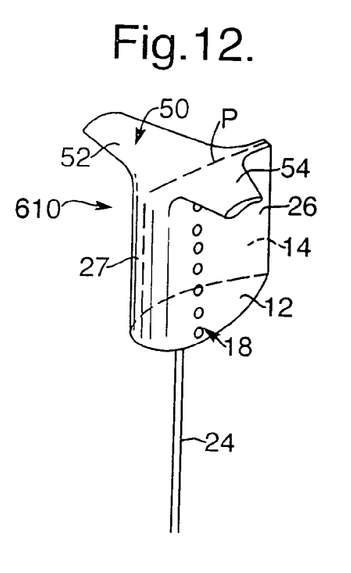
FIG. 12 is a further embodiment of an electrical power generation assembly according to the present invention.
Figure 13:
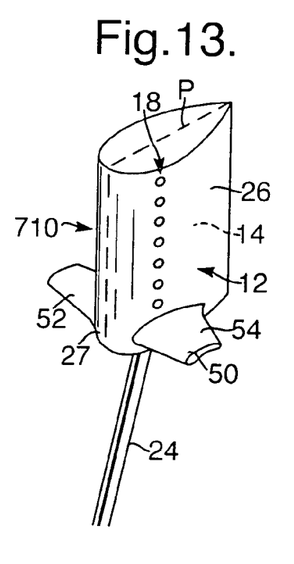
FIG. 13 is a further embodiment of an electrical power generation assembly according to the present invention.

In the embodiment an electrical power generation assembly 610 as shown in FIG. 12 the main body 12 is arranged with the central plane P arranged in a substantially vertical orientation similarly to FIG. 9. Again the frontal region 27 of the main body 12 is part cylindrical and thus is part circular in cross-section. But a wing member 50 is provided at the upper edge of the main body 12 to provide aerodynamic lift and stability to the main body 12. The symmetrical shape of the main body 12 below the wing member 50 provides a stabilising effect. Alternatively, as shown in FIG. 13, an electrical power generation assembly 710 comprises a wing member 50 provided at the lower edge of the main body 12 to provide aerodynamic lift and stability to the main body 12 and to act as a barrier for noise generated by the wind driven means 18.

Figure 14:
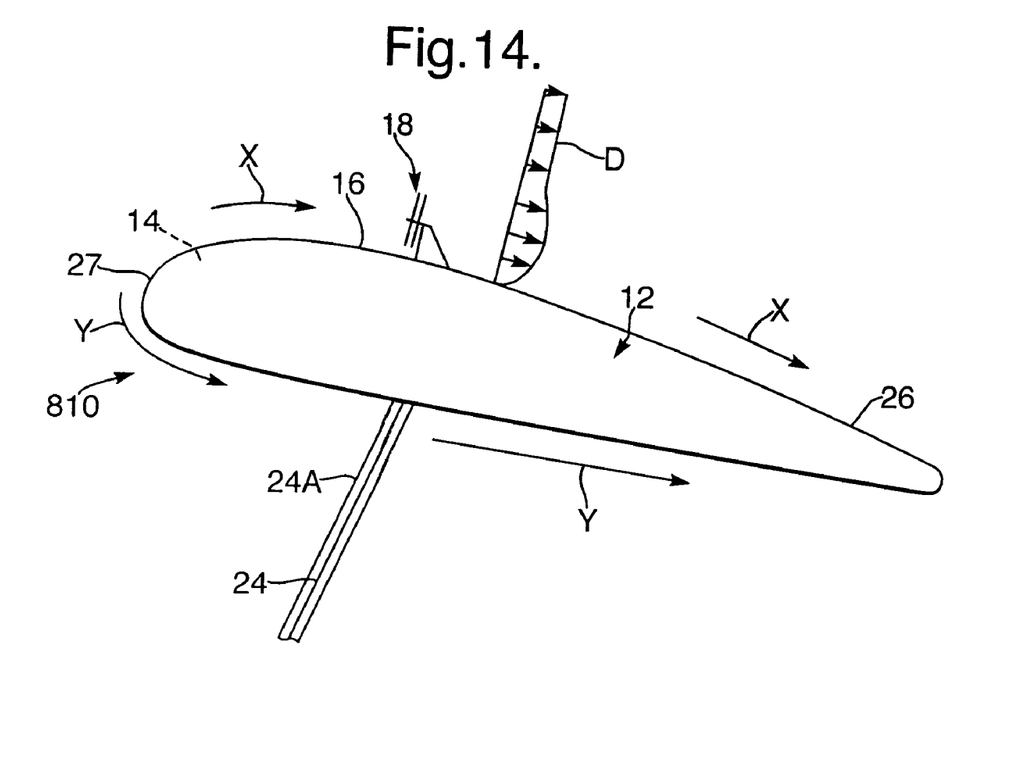
FIG. 14 is a further embodiment of an electrical power generation assembly according to the present invention.

In the embodiment shown in FIG. 14, it can be seen that the main body 12 of the electrical power generation assembly 810 has an aerofoil configuration having a tail region 26 and a bluff frontal region 27. The tail region 26 is aerodynamically configured to provide lift to main body 12. Thus, wind passing over the top of the main body 12, as indicated by arrow X, has a greater velocity than the wind passing underneath the main body 12, as indicated by arrow Y. The position of the wind turbines 18 on the main body 12 is such that they are in the region of maximum velocity. FIG. 14 shows the wind velocity profile, marked D, of the air passing over the top of the main body 12. The wind velocity close to the surface of the platform 16 is approximately 1.5 times the velocity at a region spaced above the platform 16.

The gas contained in the main body 12 may be such as to lift the main body 12 to a predetermined first altitude, for example 3000 metres. The aerodynamic configuration of the main body 12 may be such as to provide further lift to higher altitudes, for example 9000 metres. In addition to the advantages associated with higher wind speeds at high altitudes, the lifting of the main body to altitudes of 9000 metres would have the advantage of ensuring that the main body 12 is out of sight of the ground, and would also mitigate complaints from local residents relating to noise. Also, such high altitudes would eliminate any effect from adverse weather conditions on the ground, for example rain or hail.

The aerodynamic configuration of the main body 12 provides the advantage in that it provides lift which helps balance out the horizontal drag produced by the platform and the wind turbines 18. This helps maintain the main body 12 in a stable position.

The wind turbines 18 are relatively small in size and are distributed uniformly along the platform 16. This has the advantage that their weight is uniformly distributed and therefore they can be supported efficiently by the main body 12. Also, they can be positioned within the streamlines of air that have the highest kinetic energy across the platform 16. Such streamlines of air are generally slightly above the boundary layer of the air across the platform 16. The wind turbines 18 are only arranged on the platform 16 on top of the main body 12 in this example.

Figure 15:
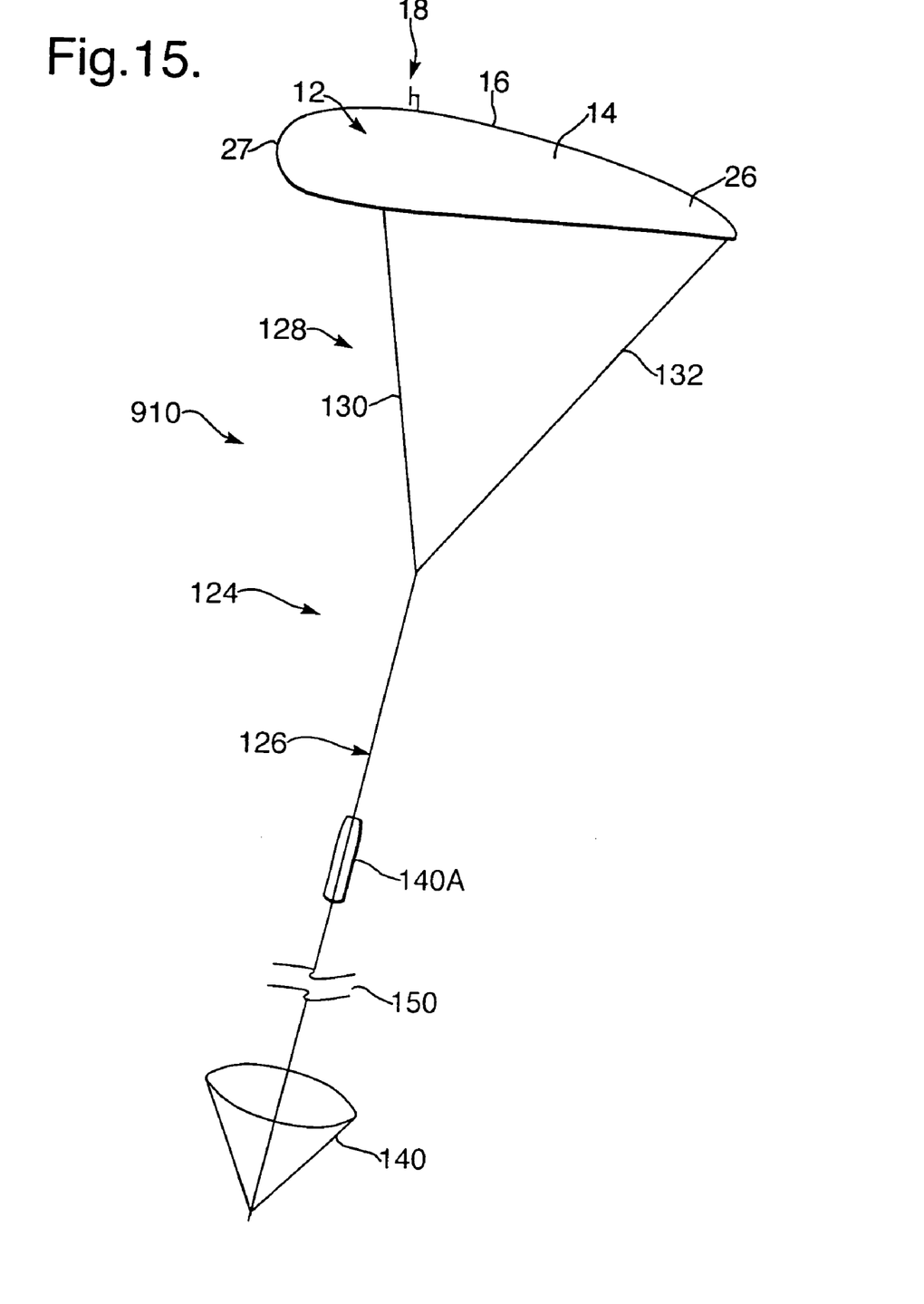
FIG. 15 shows a side view of an embodiment of an electrical power generation assembly according to the present invention.
Figure 16:
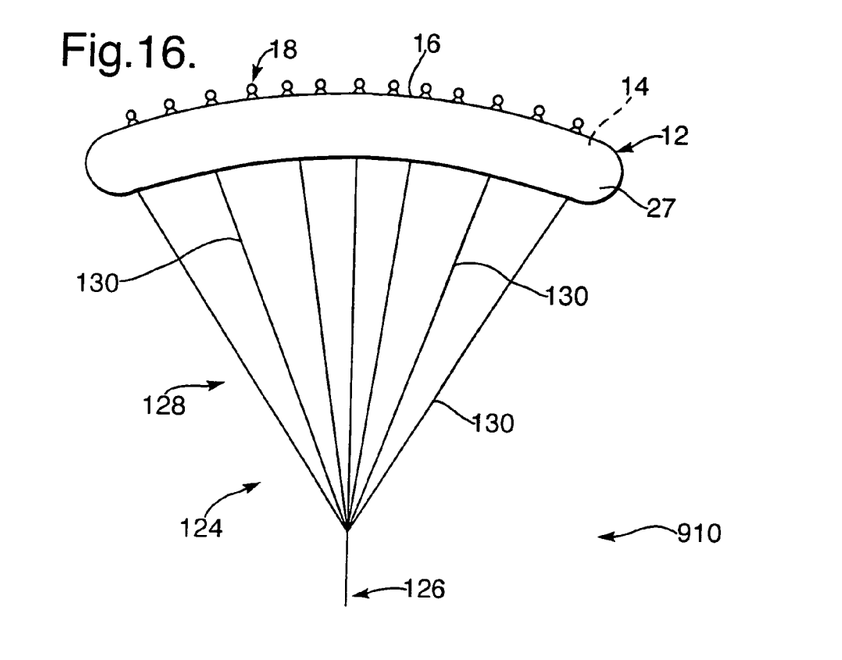
FIG. 16 shows a front view of part of the embodiment of the electrical power generation assembly shown in FIG. 15.

FIGS. 15 and 16 show further embodiments of an electrical power generation assembly 910, in which the single cable 24 is replaced by the cable arrangement 124 having a first section 126 which extends from the ground, and a second section 128 comprising a plurality of subsidiary cables 130 extending from the upper end of the first section 126 to the main body 12. Thus the main body 12 is attached to the cable arrangement 124 at a plurality of points, thereby minimising stress at each point. Also, as shown in FIG. 15, the second section 128 may further comprise pitch control means for varying the angle of pitch of the main body 12. The pitch control means comprises an adjustment cable 132 attached to the underside of the tail region 26 at the rear thereof. The adjustment cable 132 is variable in length, such that by varying the length of the adjustment cable 132, the angle of pitch of the main body 12 can be altered.

As shown in FIG. 15, the first section 126 of the cable arrangement 124 can be provided with means for restricting the velocity of descent of the first section 126 in the event that it should break. The velocity restricting means may comprise carrying means, which may be in the form of a plurality of parachutes 140 arranged in spaced relation along the first section 126 of the cable arrangement 124. The parachutes 140 are automatically deployed in the event of breakage of the first section 126. For example, in the event of a breakage occurring in the first section 126, as at the region designated 150 the parachutes 140 below the breakage 150 deploy automatically to slow the descent of the part of the first section 126 as it falls through the air, thereby avoiding damage to anything on the ground which could be hit thereby.

In normal use the parachutes 140 are stowed as shown by the parachute 140A.

As an alternative to the parachutes 140 they can be replaced by kites or balloons, which could be permanently in use to carry the weight of the cable 24 or the first section 126, thereby, reducing the lifting force required by the main body 12.

Figure 17:
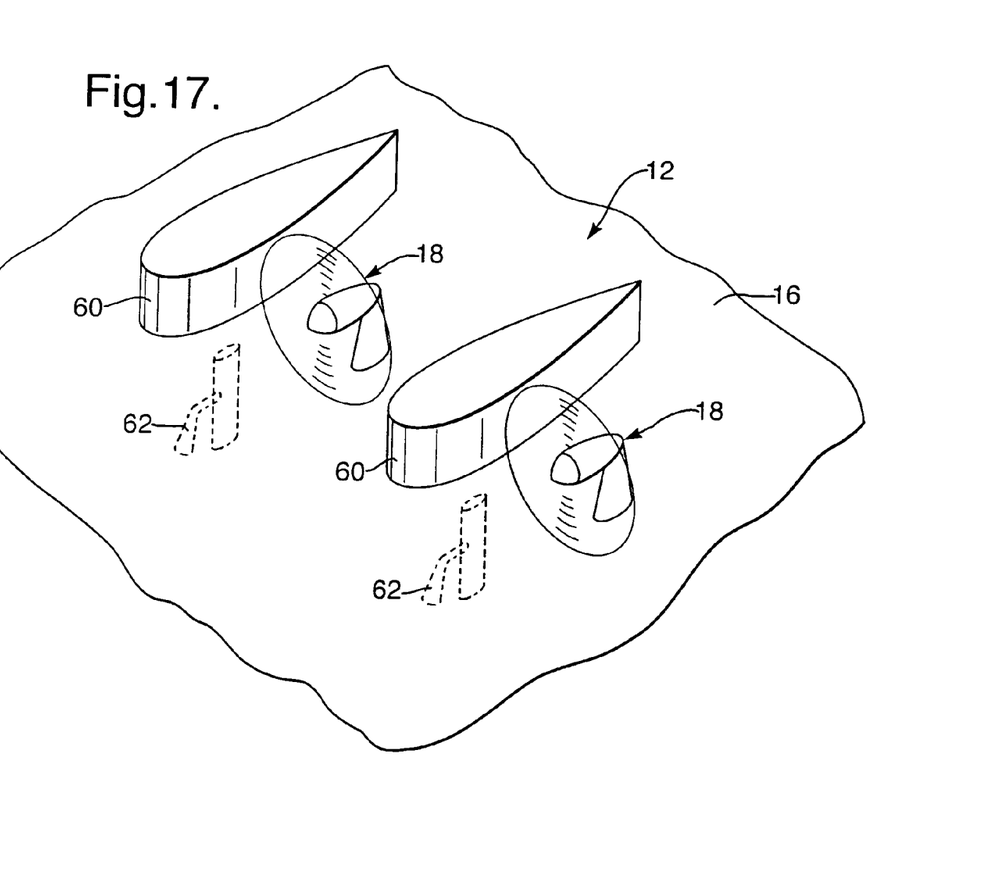
FIG. 17 is a perspective view of part of the main body of an electrical power generation assembly according to the present invention.

Referring to FIG. 17, there is shown part of the main body 12, in which wind turbines 18 are mounted. Surface features in the forms of ridges 60 extend parallel to the direction of flow of wind between adjacent wind turbines 18. The ridges 60 extend in the chordal direction of the main body 12 and correspond in shape with the expanding conical streamlines of air down wind of the wind turbines 18. In addition to the ridges 60, shown in FIG. 17, or as an alternative thereto, the platform 16 may be provided with ramps upwind and/or downwind of the wind turbines 18. This provides the advantage of increasing the efficiency of the wind turbines 18. This would have the advantage of maximising the increase in wind speed in the region of the wind turbines 18.

Figure 18:
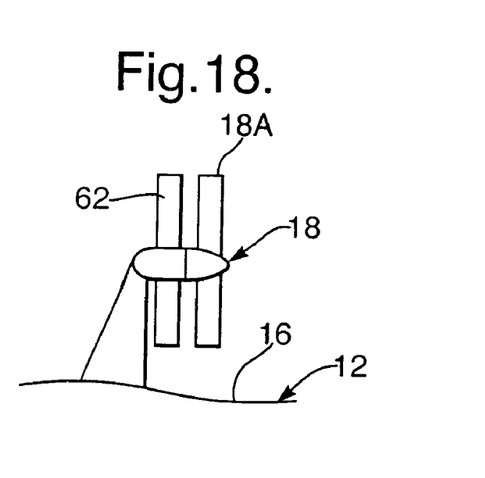
FIG. 18 shows a side view of a wind driven means having wind guide means of a further embodiment of an electrical power generation assembly according to the present invention.

In another modification, shown in FIG. 18, stator vanes 62 are arranged upstream of the rotors 18A of each wind turbine 18 to guide the wind onto the wind turbines 18. As shown in FIG. 18, the stator vanes 62 are arranged on the wind turbine 18 itself or they could be arranged on the main body 12 upstream of each respective wind turbine 18, for example as shown in broken lines in FIG. 17. The provision of the stator vanes 62 either on the wind turbine 18 or on the main body 12 would provide the advantage of increasing the efficiency of each wind turbine 18. If desired, the stator vanes 62 can be replaced by contra-rotating or variable inlet guide vanes.

Figure 19:
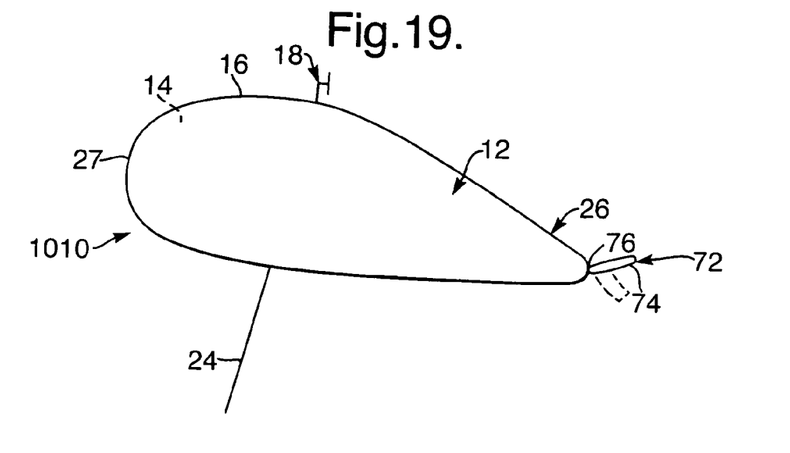
FIGS. 19 to 21 are side views of further embodiments of electrical power generation assemblies with respective different control means for varying the pitch of the main body.
Figure 20:
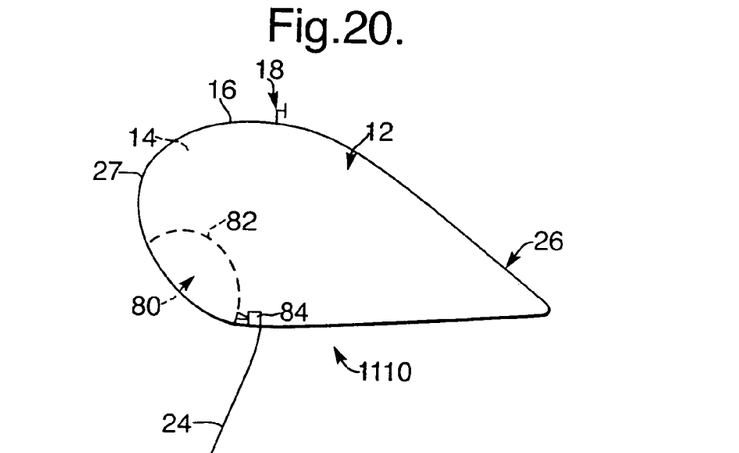
Figure 21:
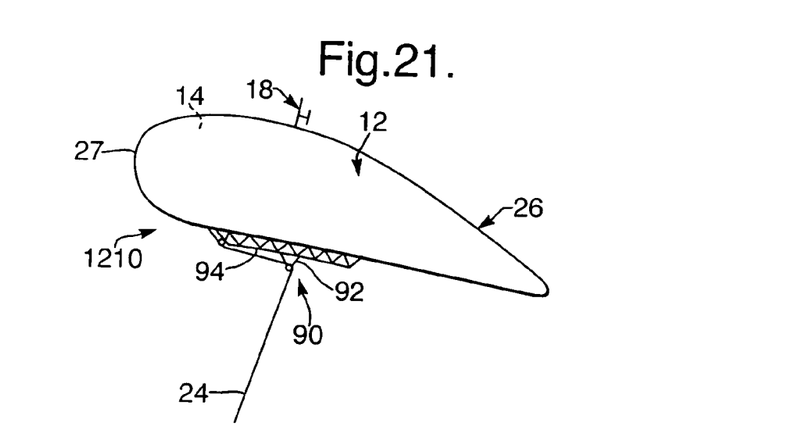

FIGS. 19 to 21 show three embodiments, having respective different pitch control means for varying the pitch of the main body 12. The embodiments shown in FIGS. 19 to 21 comprise many of the features of FIG. 2, and these have been designated with the same reference numeral.

In FIG. 19, the assembly 1010 includes pitch control means for controlling the angle of pitch of the main body 12. In FIG. 19, the pitch control means comprises a flap arrangement 72 at the rear edge region of the tail region 26. The flap arrangement 72 comprises a flap 74, which is pivotable about a pivot 76 between a first position shown in broken lines and a second position shown in solid lines. By pivoting the flap 74 about the pivot 76 between these two positions, the pitch of the main body 12 can be varied. Moving the flap 74 to the first position tilts the main body 12 forwards, and moving the flap 74 to the second position tilts the main body 12 backwards.

FIG. 20 shows a further embodiment, in which the assembly 1110 includes pitch control means in the form of buoyancy means 80 in the main body 12. The buoyancy means 80 comprises an inflatable bladder 82 which can be inflated or deflated by air pumped into the bladder 82 from outside the main body 12 by a pump 84. Inflation of the bladder 82 moves the centre of gravity of the main body 12 towards the frontal region 27, thereby tilting the main body 12 forwards. Conversely deflating the bladder 82 moves the centre of gravity of the main body 12 towards the tail region 26, thereby tilting the main body 12 backwards.

FIG. 21 shows another embodiment, in which the assembly 1210 comprises pitch control means in the form of variable position means 90 for varying the effective position of attachment of the cable 24 to the main body 12. The variable position means 90 comprises a motorised pulley arrangement 92 and a rail assembly 94 upon which the pulley arrangement 92 is mounted by wheels. The pulley arrangement 92 is moveable along the rail arrangement 94 towards the frontal region 27 of the main body 12 to move forwards the effective position of attachment of the cable 24 to the main body 12. This tilts the main body 12 backwards. The pulley arrangement is also movable towards the tail region 26 to move backwards the effective position of the cable 24 to the main body 12. This tilts the main body 12 forwards.

Various modifications can be made without departing from the scope of the invention. For example, a different gas, for example hydrogen, or a mixture of gasses having a density lower than air could be used.

Although the present invention has been described with reference to a main body with a substantially triangular prismatic shape the present invention is equally applicable to a main body with other prismatic shapes.

The invention claimed is:

1. An electrical power generation assembly comprising a main body comprising two or more portions wherein a first portion is arranged to define the frontal region of the main body and a second portion is arranged to define the remainder of the main body and said main body having a sufficiently low density to effect lift thereto, wind driven means on a surface of said main body to generate electrical power, said main body having a frontal region including a part-circular cross-section or a part-elliptical cross-section, the main body having a first distance perpendicularly from a central plane of the main body to a line of intersection between the frontal region and the remainder of the main body, the main body having a second distance from the line of intersection between the frontal region and the remainder of the main body parallel to the central plane of the main body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25 wherein said first portion of said main body contains a lighter than air fluid and said second portion of said main body contains air.

2. An electrical power generation assembly as claimed in claim 1 wherein the second portion is pressurised by the dynamic head of an airflow over the main body.

3. An electrical power generation assembly as claimed in claim 1 comprising a means to change the shape of the frontal region of the main body.

4. An electrical power generation assembly as claimed in claim 3 wherein the means to change the shape of the frontal region of the main body changes the frontal region from a substantially circular cross-section in a first mode of operation to a substantially elliptical cross-section in a second mode of operation.

5. An electrical power generation assembly as claimed in claim 3 wherein the means to change the shape of the frontal region of the main body changes the ratio of the first distance to the second distance from 0.5 to 1.5 in a first mode of operation to 3 to 5 in a second mode of operation.

6. An electrical power generation assembly as claimed in claim 3, wherein the means to change the shape of the frontal region comprises expandable means.

7. An electrical power generation assembly as claimed in claim 6 wherein the means to change the shape of the frontal region comprises inflatable means.

8. An electrical power generation assembly comprising a main body having a sufficiently low density to effect lift thereto, wind driven means on a surface of the main body to generate electrical power, the main body having a frontal region including a part-circular cross-section or a part-elliptical cross-section, the main body having a first distance perpendicularly from a central plane of the main body to a line of intersection between the frontal region and the remainder of the main body, the main body having a second distance from the line of intersection between the frontal region and the remainder of the main body parallel to the central plane of the main body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25 wherein the assembly further comprises securing means for securing the main body to the ground wherein said securing means comprises a cable assembly comprising a first section which comprises a mooring cable attached to the ground, and a second section provided on the first section, the second section comprising a plurality of subsidiary cables extending from the first section to the main body wherein the second section of the cable assembly includes pitch control means for varying the angle of pitch of the main body wherein said pitch control means comprises variable positioning means on the main body to position the securing means thereon, the positioning means being connected to the main body by drive means.

9. An electrical power generation assembly comprising a main body having a sufficiently low density to effect lift thereto, wind driven means on a surface of the main body to generate electrical power, means to change the maximum thickness of the main body, the main body having a frontal region including a part-circular cross-section or a part-elliptical cross-section, wherein the cross-sectional shape of the main body is constant throughout a significant portion of the length of said main body, the main body having a maximum thickness at the plane of intersection between the frontal region and the remainder of the main body, the main body having a first distance equal to half the maximum thickness of the main body, the main body having a second distance from the plane of intersection between the frontal region and the remainder of the main body parallel to the central plane of the main body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25.

10. An electrical power generation assembly comprising a main body having a sufficiently low density to effect lift thereto, wind driven means on a surface of the main body to generate electrical power, the main body having a frontal region including a part-circular cross-section or a part-elliptical cross-section, a first portion is arranged to define the frontal region of the main body and a second portion is arranged to define the remainder of the main body, the first portion comprises means to change the shape of the frontal region of the main body.

11. An electrical power generation assembly as claimed in claim 10 wherein the means to change the shape of the frontal region of the main body changes the frontal region from a substantially circular cross-section in a first mode of operation to a substantially elliptical cross-section in a second mode of operation.

12. An electrical power generation assembly as claimed in claim 11 wherein the means to change the shape of the frontal region comprises expandable means.

13. An electrical power generation assembly as claimed in claim 12 wherein the means to change the shape of the frontal region comprises inflatable means.

14. An electrical power generation assembly comprising a main body having a sufficiently low density to effect lift thereto, wind driven means on a surface of said main body to generate electrical power, said main body having a frontal region including a part-circular cross-section or a part-elliptical cross-section, the main body having a first distance perpendicularly from a central plane of the main body to a line of intersection between the frontal region and the remainder of the main body, the main body having a second distance from the line of intersection between the frontal region and the remainder of the main body parallel to the central plane of the main body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25 wherein the axes of rotation of the wind driven means are arranged substantially perpendicular to the plane containing the maximum thickness of the main body.

15. An electrical power generation assembly as claimed in claim 14 comprising means to move the wind driven means relative to the surface of the main body.

16. An electrical power generation assembly as claimed in claim 15 wherein the means to move the wind driven means moves the wind driven means from a first position relative to the surface of the main body in a first mode of operation to a second position nearer to the surface of the main body in a second mode of operation.

17. An electrical power generation assembly as claimed in claim 14 wherein the main body is of an aerodynamic configuration to stabilise the main body.

18. An electrical power generation assembly as claimed in claim 14 wherein the main body is rendered of said sufficiently low density by containing a gas having a sufficiently low density to effect said lift.

19. An electrical power generation assembly as claimed in claim 18 wherein the gas is helium and/or hydrogen, or comprises a substantial proportion of helium and/or hydrogen.

20. An electrical power generation assembly as claimed in claim 18 wherein the lift provided by the gas in the main body is sufficient to lift the main body to a predetermined altitude and the aerodynamic configuration of the main body is such as to provide further lift to lift the main body to higher altitudes.

21. An electrical power generation assembly as claimed in claim 14 wherein the assembly further includes transmission means for transmitting the electrical power to the ground.

22. An electrical power generation assembly as claimed in claim 14 wherein the assembly comprises securing means for securing the main body to the ground.

23. An electrical power generation assembly as claimed in claim 22 wherein the securing means and the transmission means comprise elongate members, which and are held together in close physical association with each other along their lengths.

24. An electrical power generation assembly as claimed in claim 23 wherein the securing constitutes the transmission means.

25. An electrical power generation assembly as claimed in claim 24 wherein the securing means comprises an elongate member formed to secure the main body to the ground and to transmit electrical power to the ground.

26. An electrical power generation assembly as claimed in claim 22 wherein the securing means comprises a cable, which is provided with carrying means to carry the cable, the carrying means comprising a plurality of floating members mounted on the securing means.

27. An electrical power generation assembly as claimed in claim 26 wherein the floating members comprise parachutes.

28. An electrical power generation assembly as claimed in claim 26 wherein the floating members comprise kites.

29. An electrical power generation assembly as claimed in claim 26 wherein the floating members comprise balloons wherein the balloons contain a gas which is less dense than air.

30. An electrical power generation assembly as claimed in claim 22 wherein the securing means comprises a cable assembly comprising a first section which comprises a mooring cable attached to the ground, and a second section provided on the first section, the second section comprising a plurality of subsidiary cables extending from the first section to the main body.

31. An electrical power generation assembly as claimed in claim 30 wherein the second section of the cable assembly includes pitch control means for varying the angle of pitch of the main body.

32. An electrical power generating assembly as claimed in claim 31 wherein the pitch control means comprises an adjustable cable secured to a rear region of the main body.

33. An electrical power generation assembly as claimed in claim 31 wherein the pitch control means comprises a flap arrangement along the trailing edge of the main body.

34. An electrical power generation assembly as claimed in claim 31 wherein the pitch control means comprises means for varying the buoyancy within the main body.

35. An electrical power generation assembly as claimed in claim 14 wherein the main body comprises a platform on an upper surface thereof, and the wind driven means is mounted upon the platform.

36. An electrical power generation assembly as claimed in claim 14 wherein the wind driven means comprises a plurality of said wind turbines, arranged in a line of said turbines.

37. An electrical power generation assembly as claimed in claim 36 wherein the array comprises a plurality of said lines, where each line comprises a plurality of said wind turbines.

38. An electrical power generation assembly as claimed in claim 14 wherein the main body comprises formations thereon in front of, and/or adjacent to, and/or behind the wind driven means, the formations being configured to increase wind speed onto the wind driven means.

39. An electrical power generation assembly as claimed in claim 38 wherein the formations comprise ridges arranged between the wind turbines, the ridges being arranged to correspond with the streamlines of wind downstream of the wind turbines, thereby enhancing wind speed through the wind turbines.

40. An electrical power generation assembly as claimed in claim 38 wherein the formations comprise wind guide means on the main body upstream of the wind turbines to guide the air onto the wind turbines in such a way as to maximise the efficiency of the wind turbines.

41. An electrical power generation assembly as claimed in claim 40 wherein the said wind guide means comprise contra-rotation guide vanes, variable inlet guide vanes, or static guide vanes.

42. An electrical power generation assembly as claimed in claim 14 wherein the wind driven means are arranged at the line of intersection between the frontal region and the remainder of the main body.

43. An electrical power generation assembly comprising a main body having a sufficiently low density to effect lift thereto, wind driven means on a surface of the main body to generate electrical power, the main body having a frontal region including a part-circular cross-section or a part-elliptical cross-section, wherein the cross-sectional shape of the main body is constant throughout a significant portion of the length of said main body, the main body having a maximum thickness at the plane of intersection between the frontal region and the remainder of the main body, the main body having a first distance equal to half the maximum thickness of the main body, the main body having a second distance from the plane of intersection between the frontal region and the remainder of the main body parallel to the central plane of the main body to a line of intersection between the most upstream points of the frontal region and the central plane of the main body, the ratio of the first distance to the second distance being equal to or more than 0.5 and equal to or less than 5, the wind driven means having a diameter and the ratio of the diameter of the wind driven means to the first distance being equal to or less than 0.25 wherein the axes of rotation of the wind driven means are arranged substantially perpendicular to the plane containing the maximum thickness of the main body.

44. An electrical power generation assembly as claimed in claim 43 further comprising means to move the wind driven means relative to the surface of the main body wherein the first distance extends perpendicularly from a central plane of the main body to a line of intersection between the frontal region and the remainder of the main body.

45. An electrical power generation assembly as claimed in claim 44 wherein the means to move the wind driven means moves the wind driven means from a first position relative to the surface of the main body in a first mode of operation to a second position nearer to the surface of the main body in a second mode of operation.

46. An electrical power generation assembly as claimed in claim 43 wherein the wind driven means are arranged at the point of maximum thickness of the main body.

* * * * *